United States Patent
Ochi et al.

(10) Patent No.: US 10,436,944 B2
(45) Date of Patent: Oct. 8, 2019

(54) OPTICAL ELEMENT AND OPTICAL DEVICE

(71) Applicant: CANON KABUSHIKI KAISHA, Tokyo (JP)

(72) Inventors: Norihiko Ochi, Kawasaki (JP); Junri Ishikura, Tokyo (JP); Shuhei Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/983,277

(22) Filed: May 18, 2018

(65) Prior Publication Data

US 2018/0341046 A1 Nov. 29, 2018

(30) Foreign Application Priority Data

May 25, 2017 (JP) .................. 2017-103740

(51) Int. Cl.
*G02B 1/11* (2015.01)
*G02B 5/00* (2006.01)
*G02B 27/00* (2006.01)

(52) U.S. Cl.
CPC .............. *G02B 1/11* (2013.01); *G02B 5/003* (2013.01); *G02B 27/0018* (2013.01)

(58) Field of Classification Search
CPC ...... G02B 1/11; G02B 5/003; G02B 27/0018; G02B 9/00; G02B 3/00; G02B 2003/0093
USPC ....................................................... 359/601
See application file for complete search history.

(56) References Cited

U.S. PATENT DOCUMENTS

2014/0160571 A1 6/2014 Miyazaki et al.

FOREIGN PATENT DOCUMENTS

| EP | 2 423 713 A1 | 2/2012 |
|---|---|---|
| EP | 2 546 682 A2 | 1/2013 |
| JP | H06-235853 A | 8/1994 |
| JP | 2007-183444 A | 7/2007 |
| JP | 2010-269957 A | 12/2010 |
| JP | 2013-037250 A | 2/2013 |
| JP | 2015-018178 A | 1/2015 |

OTHER PUBLICATIONS

Oct. 15, 2018 European Search Report in European Patent Appln. No. 18173885.7.

*Primary Examiner* — Ryan D Howard
(74) *Attorney, Agent, or Firm* — Venable LLP

(57) ABSTRACT

An optical element includes an optically effective surface and an optically non-effective surface, and a light-shielding coating film is formed on the optically non-effective surface. The optically non-effective surface includes a round-chamfered concave step corner section, the light-shielding coating film is formed over the entire concave step corner section, the light-shielding coating film has a raised area near a location where one of planes of the concave step corner section is connected to the round chamfer. Consequently, film cracking of the optically non-effective surface of a stepped shape is inhibited and a reliable optical element is provided.

12 Claims, 7 Drawing Sheets

OPTICAL ELEMENT AND OPTICAL DEVICE

BACKGROUND OF THE INVENTION

Field of the Invention

The present invention relates to an optical element equipped with a light-shielding coating film on an optically non-effective surface as well as to an optical device having the optical element.

Description of the Related Art

Optical devices such as cameras use lenses as optical elements. Most of light entering such a lens exits a surface on an opposite side and becomes effective luminous flux (imaging luminous flux), but a fraction of the light is internally reflected by an outer peripheral surface (edge surface) of the lens, becoming harmful light and thereby causing degradation of image quality.

Therefore, in an optical device such as a camera that uses a large number of lenses in combination, the edge surfaces of the lenses are covered with a light-shielding coating film to prevent reflection such that the image quality will not be degraded by internal reflection.

The edge surfaces are not always made up solely of surfaces parallel to an optical axis direction, and may be made up of a combination with surfaces perpendicular to the optical direction, forming a step. A shape forming a step in this way is referred to as a stepped shape.

The stepped shape may sometimes be provided with a round chamfer with a step corner section being rounded. When a lens having an edge surface of stepped shape provided with such a round chamfer is cut along a plane including an optical axis, in the resulting section, a line that represents the edge surface is made up of a combination of a curve corresponding to the round chamfer and a line segment corresponding to a flat portion.

Generally, the edge surface is formed into a desired shape by grinding and the light-shielding coating film provided on the edge surface is formed by applying thermosetting light-shielding paint to the edge surface and baking the light-shielding paint.

The light-shielding coating film provided on the edge surface needs not only to excel in light-shielding performance and antireflection performance, but also to guarantee a certain degree of durability in a high-temperature high-humidity environment as well as a certain degree of positional accuracy in incorporating the lens into a lens barrel.

Japanese Patent Application Laid-Open No. H06-235853 discloses a technique for increasing positional accuracy by reducing the elastic modulus (increasing the flexibility) of a lens barrel and thereby incorporating the lens into the lens barrel in such a way that an inner shape of the lens barrel will follow an outer shape of the lens. Also, Japanese Patent Application Laid-Open No 2007-183444 discloses a technique for preventing separation of a light-shielding coating film by increasing the flexibility of the light-shielding coating film (anti-internal-reflection layer) using a flexible adhesive as a base material for the light-shielding coating film.

Since the technique disclosed in Japanese Patent Application Laid-Open No. H06-235853 is intended to guarantee positional accuracy by making the lens barrel follow the outer shape of the lens, the light-shielding coating film needs to have high elastic modulus to some extent. However, if the light-shielding coating film is formed using thermosetting light-shielding paint, when room temperature is tested after baking, the light-shielding coating film shrinks, but the lens shrinks little. Consequently, tensile stress corresponding to the product of a strain amount of the film and the elastic modulus of the film exists in the light-shielding coating film, posing a problem in that the film is prone to film cracking if the elastic modulus (rigidity) of the film is increased. This problem also arises when a heat history is provided after film formation.

Being designed to adjust the elastic modulus of the light-shielding coating film, the technique disclosed in Japanese Patent Application Laid-Open No. 2007-183444 can also adjust the elastic modulus (rigidity) of the film in such a way as to guarantee positional accuracy relative to the lens barrel while inhibiting film cracking due to heat history. However, the film cracking peculiar to high-temperature high-humidity environments cannot be inhibited. This problem will be described below.

Each of plural surfaces making up an edge surface of a stepped shape is formed by grinding the glass material. Consequently, a large number of microcracks often occur in a surface of the glass material especially in a neighborhood of a boundary between surfaces. This is because machining stresses are concentrated in the neighborhood of the boundary when a machining direction is changed. This is also true when a round chamfer is formed in a step corner.

On the other hand, because the light-shielding coating film is made of a resin material, water vapor readily penetrates the film at high temperature and high humidity. Consequently, water vapor accumulates by entering microcracks produced in the surface of the glass material in the neighborhood of the boundary. In so doing, due to expansion of water vapor resulting from temperature rises and stress corrosion of the glass material caused by water, the cracks in the glass surface tend to spread. Then, it is considered that residual tensile stress produced during film formation and a force tending to spread cracks in the glass material, when added together, cause film cracking in excess of allowable stress of the film.

In particular, if the surface has been formed into a stepped shape including a round-chamfered concave step corner section, the light-shielding paint is liable to collect in the round chamfer in forming the light-shielding coating film, and high tensile stress remains in that part of the light-shielding coating film which corresponds to the round chamfer, due to a heat history at the time of film formation. Therefore, in a neighborhood of a boundary between the round chamfer and an adjacent flat portion, once film cracking occurs even in a small area, the film cracks in a wide area starting therefrom, under the influence of the high tensile stress of the film around the round chamfer, which might result in insufficient light-shielding performance and antireflection performance.

The present invention has been made in view of the above-mentioned problems in the related art and has an object to provide a reliable optical element in which film cracking of a light-shielding coating film formed on an edge surface of a stepped shape is inhibited even in a high-temperature high-humidity environment.

SUMMARY OF THE INVENTION

To solve the problems described above, one aspect of the present invention is directed at providing an optical element comprising an optically effective surface and an optically non-effective surface, a light-shielding coating film being formed on the optically non-effective surface, wherein: the optically non-effective surface includes a concave step corner section; in a section obtained when the optical element is cut along a plane crossing the concave step corner section and perpendicular to a ridge line of the concave step corner section, a line corresponding to a surface of the concave step corner section has a shape in which two line segments are smoothly connected to each other via an arc-shaped curve; and when that end of each of the two line segments which borders on the curve is designated as an inner end of each of the line segment while an opposite end is designated as an outer end of the line segment, the light-shielding coating film is formed on a surface of the concave step corner section of the optically non-effective surface so as to have a raised area that increases in film thickness continuously or stepwise from the inner end to the outer end and then decreases continuously or stepwise on at least one of the two line segments in the section.

To solve the problems described above, another aspect of the present invention is directed at providing a method for producing an optical element by preparing a transparent substrate that includes an optically effective surface and an optically non-effective surface and by forming a light-shielding coating film on the optically non-effective surface of the transparent substrate, wherein the forming the light-shielding coating film includes: a first step of applying light-shielding paint to a desired region including a concave step corner section of the optically non-effective surface, drying the light-shielding paint, and thereby forming a flat coating film, and a second step of partially applying the light-shielding paint to part of the desired region with the flat coating film formed thereon, drying the light-shielding paint, thereby forming a raised coating film, subsequently baking the entire coating film, and thereby forming the light-shielding coating film having the raised area; or a first step of partially applying the light-shielding paint to part of a desired region including the concave step corner section of the optically non-effective surface, drying the light-shielding paint, and thereby forming a raised coating film, and a second step of applying the light-shielding paint to the entire desired region including an area with the raised coating film formed thereon, drying the light-shielding paint, thereby forming a flat coating film, subsequently baking the entire coating film, and thereby forming the light-shielding coating film having the raised area.

The present invention provide a reliable optical element in which film cracking of a light-shielding coating film formed on an edge surface of a stepped shape is inhibited even in a high-temperature high-humidity environment.

Further features of the present invention will became apparent from the following description of exemplary embodiments with reference to the attached drawings.

DESCRIPTION OF THE EMBODIMENTS

Preferred embodiments of the present invention will now be described in detail in accordance with the accompanying drawings.

An embodiment of the present invention will be described below. The present invention is applied to various optical elements that have an optically effective surface and an optically non-effective surface with a light-shielding coating film (anti-internal-reflection film) formed on the optically non-effective surface. Examples of optical elements having such an optically effective surface and optically non-effective surface include a lens, prism, mirror, wave plate, and beam splitter. However, for simplicity of description, a lens will be described here by way of example as a representative of such optical elements, and other optical elements will be described supplementarily as needed.

In the present invention, the "optically effective surface" refers to a surface or a boundary surface having some optical effect such as refraction or reflection on a ray or luminous flux incident on the surface. Typical examples of the optically effective surface include a light entrance/exit surface of a lens, an internal reflection surface of a prism, and a reflection surface of a mirror. On the other hand, the "optically non-effective surface" refers to a surface or boundary surface of the optical element other than the optically effective surface. Typical examples of the optically non-effective surface include an edge surface of a lens, a side end surface of a prism, or an outer circumferential surface of a mirror. A ray or luminous flux entering the optically non-effective surface (from inside or outside the optical element) and then exiting the surface by reflection, transmission, refraction, or the like might interfere with an original function of the optical element (typically, degrade image quality) by becoming extraordinary light or harmful light. Thus, desirably the ray or luminous flux is absorbed by the surface and does not exit the surface. The light-shielding coating film (anti-internal-reflection film) provided on the optically non-effective surface is intended to inhibit such extraordinary light (harmful light).

(Configuration of Optical Element)

Figure 1:
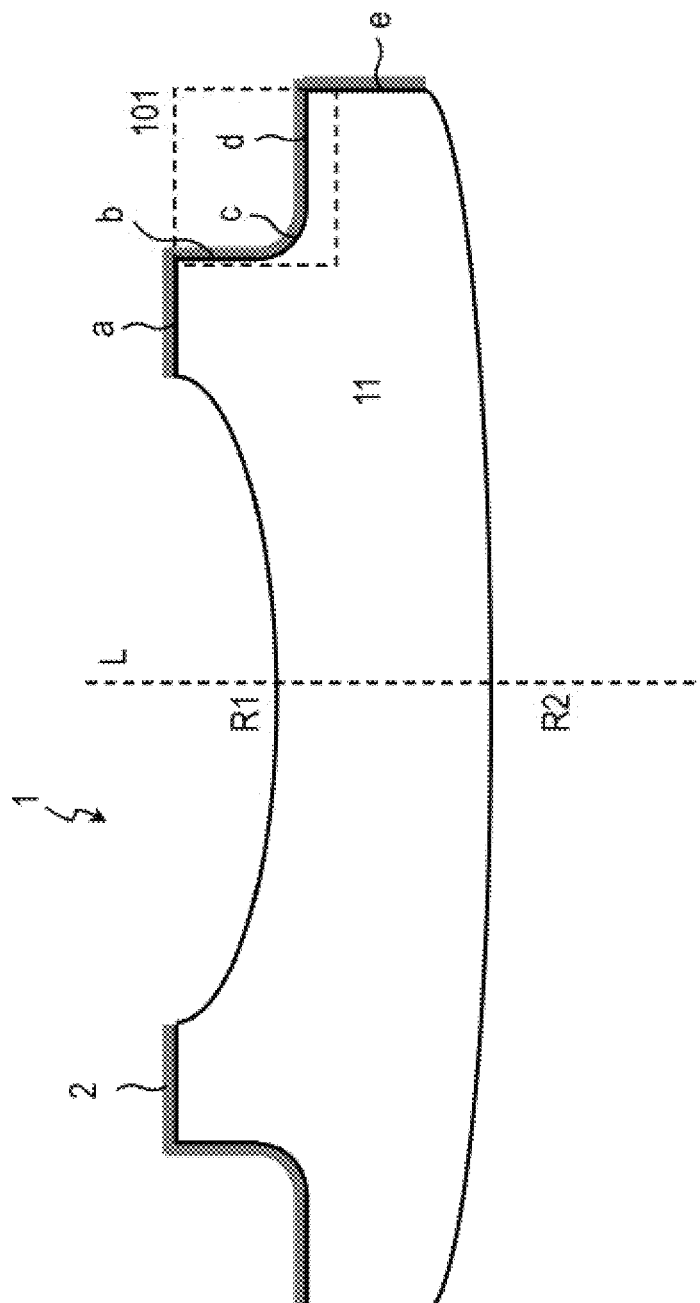
FIG. 1 is a schematic seasonal view of an optical element (lens) to which the present invention is applied.

The optical element according to the present invention will be described below by taking a lens as an example. FIG. 1 is a schematic sectional view of a lens 1 having an edge surface of a stepped shape as the lens 1 is cut along a plane including an optical axis L. As shown in FIG. 1, the lens 1 is a concave meniscus lens having optically effective surfaces R1 and R2. In outer circumferential part of the lens 1, edge surfaces a, b, c, d and e, each of which is an optically non-effective surface formed into an annular shape, are connected in this order, forming an edge surface of a stepped shape as a whole. Of the edge surfaces a to e, the edge surfaces a and d are planes perpendicular to the optical axis L of the lens 1 while the edge surfaces b and e are cylindrical surfaces parallel to the optical axis L. The edge surface c is formed between the edge surface b and edge surface d by round-chamfering a concave step corner section 101 between the edge surface b and edge surface d. As shown in FIG. 1, in a section obtained when the lens 1 is cut along a plane including the optical axis L, the edge surface a, edge surface b, edge surface d and edge surface e are represented by straight lines (line segments) while the edge surface c is represented by an arc-shaped curve.

Note that whereas in the case of a lens, generally a section obtained when the lens is cut along a plane including the optical axis precisely expresses the concave step corner section of a stepped shape formed on the edge surface, this is not always the case with optical elements in general. The present invention addresses a sectional shape of the concave step corner section (and a light-shielding coating film formed thereon), and the sectional shape is obtained when the optical element is cut along the plane described below. That is, the present invention addresses the shapes of a substrate surface and film surface in a section obtained when the optical element is cut along a plane that crosses the concave step corner section on which the light-shielding coating film is provided and that is perpendicular to a ridge line (a line formed at an intersection of two surfaces on opposite sides of the concave step corner section excluding a round chamfer when the two surfaces are extended) of the concave step corner section. When the two surfaces on opposite sides of the concave step corner section are curved surfaces rather than being strictly a plane, the ridge line of the concave step corner section is not a straight line, and the optical element can be cut such that a tangent to the ridge line at an intersection of the ridge line with the section will be perpendicular to the section.

In FIG. 1, although the edge surfaces a and d are illustrated as being perpendicular to the optical axis L while the edge surfaces b and e are illustrated as being parallel to the optical axis L, the edge surfaces do not need to be strictly perpendicular or parallel, and may be tilted by deviating more or less from being parallel or perpendicular to the optical axis L. Even in such cases, if the overall edge surface has level differences as a whole, the edge surface can be regarded as having a stepped shape. In that case, although the edge surfaces a and d are not strictly planes and the edge surfaces b and e are not strictly cylindrical surfaces (but are circular-conical surfaces), the terms "plane" and "cylindrical surface" described above are used as including such cases. Also, in the section shown in FIG. 1, the edge surface c is represented by an arc-shaped curve, the "arc-shaped curve" as referred to herein is not necessarily a concept that means part of a perfect circle, but is a concept that includes a curve that approximates a perfect circle.

In addition, the edge surfaces a, b, d and e, which are optically non-effective surfaces, do not need to be regular surfaces such as planes or cylindrical surfaces (or circular-conical surfaces) in the strict sense, and may include some irregular waviness or the like. Moreover, although in the section of FIG. 1, the edge surfaces a, b, c, d and e are represented by straight lines or smooth curves, it should be noted that such optically non-effective surfaces generally have some irregularities (roughness, graininess) rather than being flat and smooth. Therefore, it should be noted that in the shape representation of edge surfaces provided above, such irregular waviness and minute irregularities are abstracted (leveled out).

The edge surfaces a and b are connected with each other and the edge surfaces d and e are connected with each other, forming respective convex step corner sections. The edge surfaces b and d that form the concave step corner section 101 are connected smoothly with each other via the edge surface c that makes up a round chamfer. However, the phrase "connected smoothly" here roughly means connected without forming a right angle or an acute angle in the section shown in FIG. 1. Being connected smoothly does not exclude, for example, a situation in which a line segment representing the edge surface b and an arc-shaped curve (more precisely, a tangent to the curve at a junction point between b and c) representing the edge surface c are connected at the junction point, forming an obtuse angle of about 160 degrees. This is also true of connection between the edge surface c and edge surface d.

Figure 2:
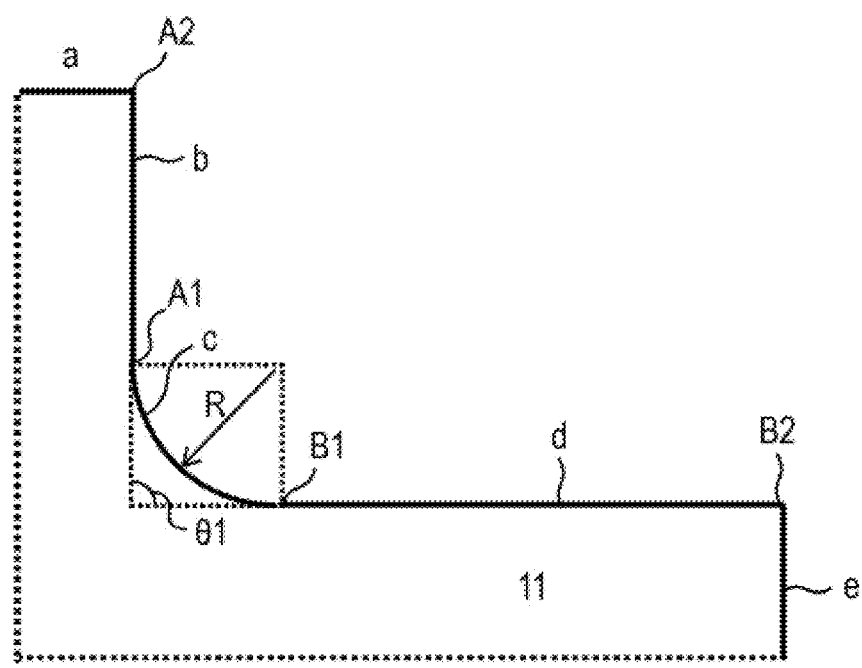
FIG. 2 is an enlarged view showing part of a section of an edge surface of a lens shown in FIG. 1.

Next, the shape of the edge surfaces of the lens 1 shown in FIG. 1 will be described in more detail with reference to FIG. 2. FIG. 2 is an enlarged sectional view of the concave step corner section 101 made up of the edge surface b, edge surface c and edge surface d of FIG. 1. In FIG. 2, point A1 is a boundary between the edge surface b and edge surface c while point A2 is a boundary between the edge surface a and edge surface b. Also, point B1 is a boundary between the edge surface c and edge surface d while point B2 is a boundary between the edge surface d and edge surface e. Viewed from another angle, by focusing on the three edge surfaces b, c and d making up the concave step corner section 101, those ends of the edge surfaces b and d that are on the side connected with the edge surface c can be designated as inner ends while the ends on the side opposite the inner ends can be designated as outer ends. According to these definitions, point A1 is the inner end of the edge surface b, point A2 is the outer end of the edge surface b, point B1 is the inner end of the edge surface d, and point B2 is the outer end of the edge surface d.

The edge surfaces are formed by grinding a transparent substrate 11 made of glass or resin. In so doing, if an angle $\theta 1$ formed by the edge surface b and edge surface d of the transparent substrate prepared by grinding is smaller than 90 degrees or the radius of curvature R of the edge surface c is smaller than 0.5 mm, chips tend to occur during machining. On the other hand, if the angle $\theta 1$ is larger than 140 degrees or the radius of curvature R is larger than 4 mm, a machining load on a boundary region between surfaces can be reduced sufficiently, but on the other hand, restrictions in a design stage of the lens are increased. Thus, desirably the angle $\theta 1$ formed by (line segments representing) the edge surface b and edge surface d making up the concave step corner section 101 (shown in the sectional view of FIG. 2) of the substrate 11 of the lens (i.e., lens substrate) according to the present embodiment is between 90 degrees and 140 degrees. Also, desirably the radius of curvature R of (a curve representing) the edge surface c making up the round chamfer of the concave step corner section 101 is between 0.5 mm and 4 mm (both inclusive).

Figure 3:
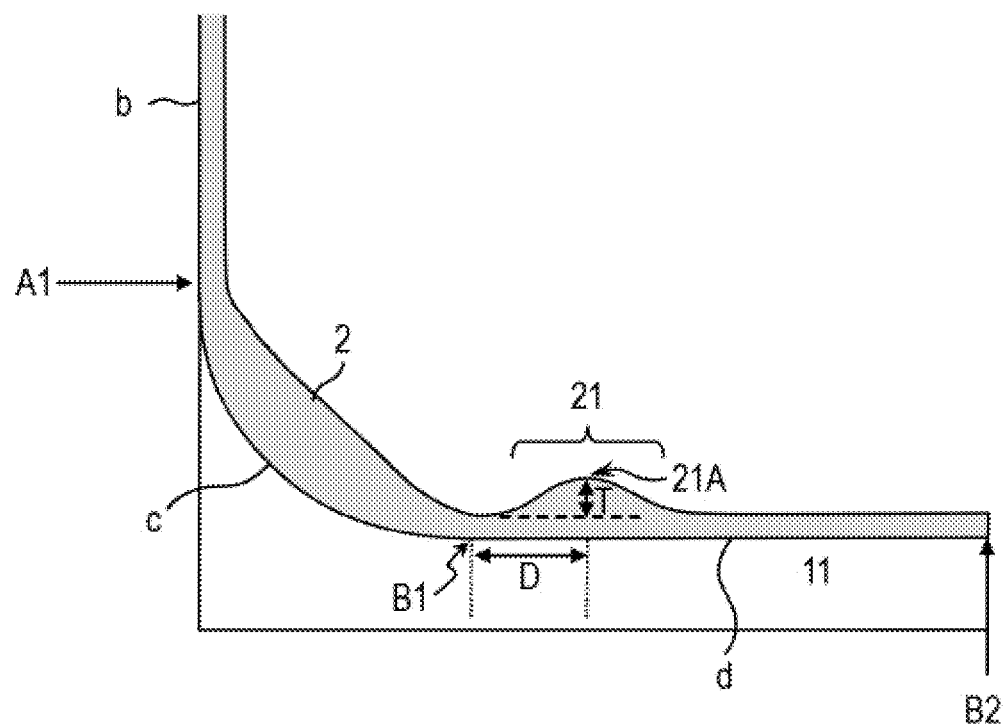
FIG. 3 is an enlarged view showing part of a sectional shape of a light-shielding coating film formed on an optically non-effective surface of the optical element according to the present invention.

FIG. 3 shows a sectional shape of a light-shielding coating film 2 formed on the concave step corner section made up of the edge surfaces b, c and d in the present embodiment. As shown in FIG. 3, the light-shielding coating film 2 is provided over the entire concave step corner section extending from the edge surface b to the edge surface c to the edge surface d. In so doing, a raised area 21 in which film thickness of the light-shielding coating film 2 increases continuously or stepwise from the inner end B1 toward the outer end B2 and then decreases continuously or stepwise is formed in the neighborhood of the inner end B1 of the edge surface d, which is one of surfaces making up the concave step corner section. That is, the film thickness of the light-shielding coating film 2 is larger in the raised area 21 than in upper part of the inner end B1. Note that as described earlier, since light-shielding paint is liable to collect in the edge surface c, which is the round chamfer of the concave step corner section, the film thickness of the light-shielding coating film 2 on the edge surface c is larger than the film thickness on the inner end B1 of the edge surface d and the inner end A1 of the edge surface b.

In the process of producing an optical element (lens 1), if the optical element undergoes a heat history in providing the light-shielding coating film 2 on the edge surfaces of the substrate 11, with decreases in temperature, tensile stress acts on the light-shielding coating film 2 higher in expansion coefficient than the substrate 11 and remains in the film. However, when the raised area 21 is provided in the neighborhood of the inner end B1 of the edge surface d as shown in FIG. 3, a pressing force from the raised area 21 acts as compressive stress on the light-shielding coating film 2 in the neighborhood of the inner end B1. Consequently, tensile stress remaining in the light-shielding coating film 2 in the neighborhood of the inner end B1 is decreased by being canceled out, making it conceivable that the effect of preventing film cracking in the neighborhood of the inner end B1 will be available.

In so doing, it is considered that the larger a ratio T/D of a difference T between the film thickness at the inner end B1 and the film thickness at a vertex 21A of the raised area 21 to a horizontal distance D from the inner end B1 to the vertex 21A of the raised area, the larger the compressive stress acting on the light-shielding coating film 2 on the inner end B1 from the raised area 21. The present inventors have found that the compressive stress effective in preventing film cracking acts sufficiently on the light-shielding coating film 2 on the inner end B1 from the raised area 21 when the ratio T/D is in the range of 0.02 to 0.10. Note that the "the horizontal distance," as used herein, refers to a distance measured along the edge surface (edge surface d in the example of FIG. 3) on which the raised area 21 is provided, regardless of the direction of gravity.

Whereas the raised area 21 is formed on the edge surface d (i.e., that one of the two edge surfaces making up the concave step corner section which is perpendicular to the optical axis) in the example of FIG. 3, a raised area may be formed on the edge surface b (i.e., that one of the two edge surfaces making up the concave step corner section which is parallel to the optical axis). Alternatively, raised areas may be formed on both the edge surface b and edge surface d. In these cases, effects equivalent to or better than when a raised area is formed only on the edge surface d are obtained.

Desirably the raised area 21 is located on the edge surface d, and a base of the raised area 21 either touches the inner end B1 or is located slightly away from the inner end B1 in such a way as to fall short of touching the inner end B1. That is, a value of the horizontal distance D is normally about 100 μm to 800 μm, and desirably about 200 μm to 600 μm although this depends on a height T of the raised area.

(Material and Formation Procedures of Light-shielding Coating Film)

The light-shielding coating film 2 is normally made of a coating film of light-shielding paint whose main components are a resin, fine inorganic particles and a coloring agent. Desirably the resin used for the light-shielding coating film 2 may be a thermosetting resin selected appropriately from the group consisting of epoxy resins, alkyd resins and acrylic resins. Of these resins, more desirably an epoxy resin is used because of excellent dimensional stability.

The fine inorganic particles are used to adjust an index of refraction of the light-shielding coating film 2. As the fine inorganic particles, titanium oxide, zirconium oxide, cerium oxide and tin oxide are used desirably. Of these substances, more desirably titanium oxide is used because of its high index of refraction.

As the coloring agent, a dye or pigment can be used, and desirably a dye is used because of its capability to be dispersed uniformly in the light-shielding coating film 2. As the pigment, at least one or more black pigments selected from the group consisting of carbon black, titanium black, copper oxide and iron oxide (colcothar) are used desirably. As the dye, an anthraquinone dye, phthalocyanine dye, stilbenzene dye, pyrazolone dye, thiazole dye, carbonium dye, or azine dye is used desirably.

As light-shielding paint for use to prepare optical elements, paint, such as GT-7II and GT-20 (trade names of products made by Canon Chemicals Inc.), whose main components are resins, dyes and various types of fine particles are used desirably. However, this is not restrictive as long as the characteristics including optical characteristics, index of refraction, and film durability, required of a light-shielding coating film for the optical element to be used are satisfied. Note that the light-shielding paint may be diluted with a solvent as needed.

The light-shielding paint may be applied directly to the optically non-effective surface (edge surface) using a bar coating method, spray coating method, dip coating method, inkjet method, or the like or may be applied via another medium using a brush coating method, sponge coating method, roll coating method, or the like.

Procedures for forming the raised area 21 on the light-shielding coating film 2 will be described with reference to FIGS. 4A, 4B, 5A and 5B. A first method involves applying light-shielding paint to a desired region (entire area in this case) of the optically non-effective surface (edge surface) and thereby forming flat coating film as shown in FIG. 4A, followed by drying and baking, and then partially applying the light-shielding paint to a site F to be raised and thereby forming a raised coating film as shown in FIG. 4B, followed by drying and baking (the entire coating film formed so far).

Figure 4A:
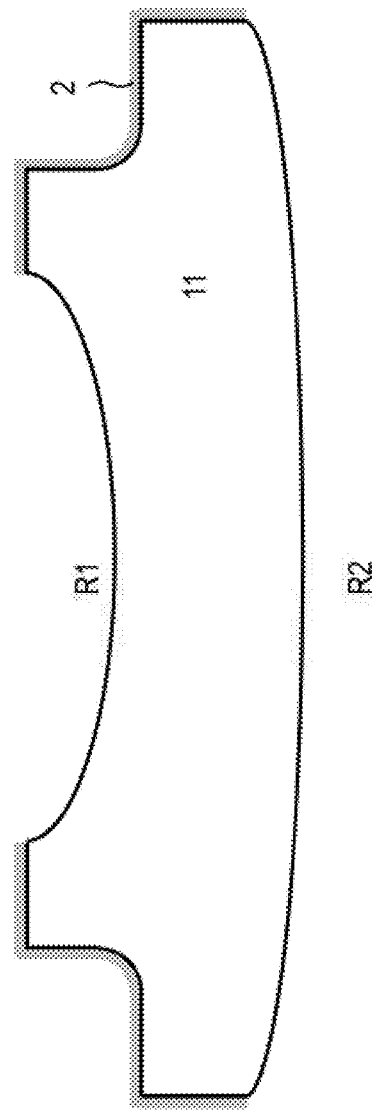
FIGS. 4A and 4B are sectional views showing procedures for forming light-shielding coating films in Examples 1 to 3 and 7 to 8.
Figure 4B:
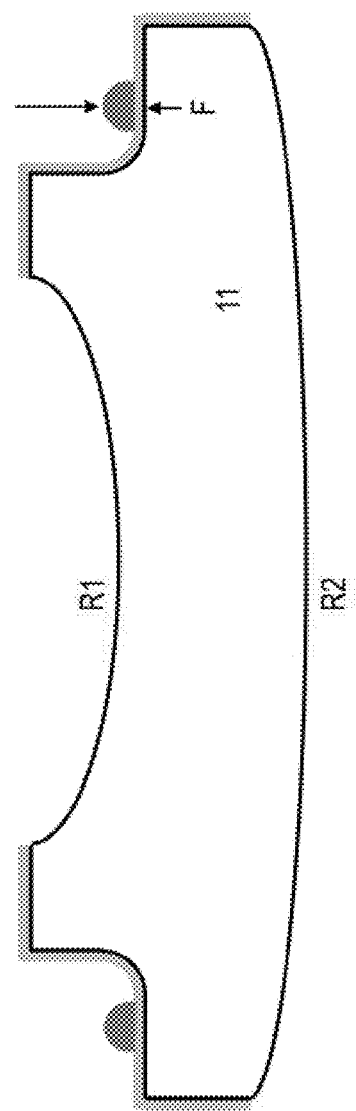

A second method involves applying light-shielding paint to the entire area of the optically non-effective surface (edge surface) and thereby forming flat coating film as shown in FIG. 4A, followed by drying without baking, and then applying the light-shielding paint to a site F to be partially raised and thereby forming a raised coating film as shown in FIG. 4B, followed by drying and baking.

Figure 5A:
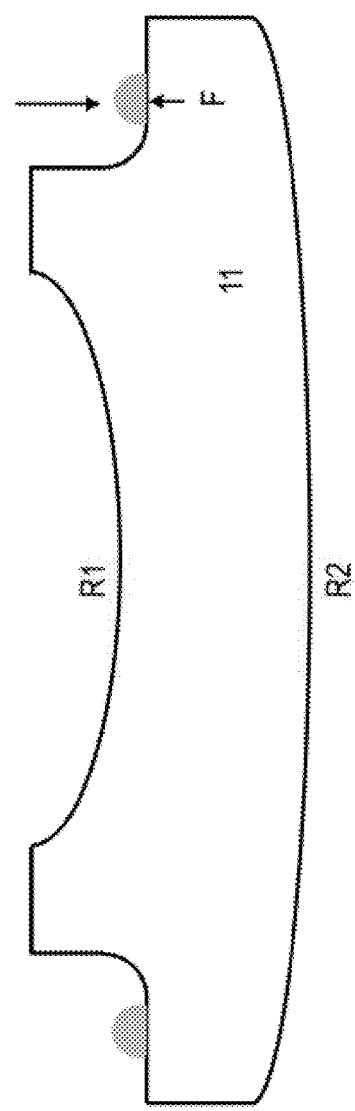
FIGS. 5A and 5B are sectional views showing procedures for forming light-shielding coating films of Examples 4 to 6 and 9 to 10.
Figure 5B:
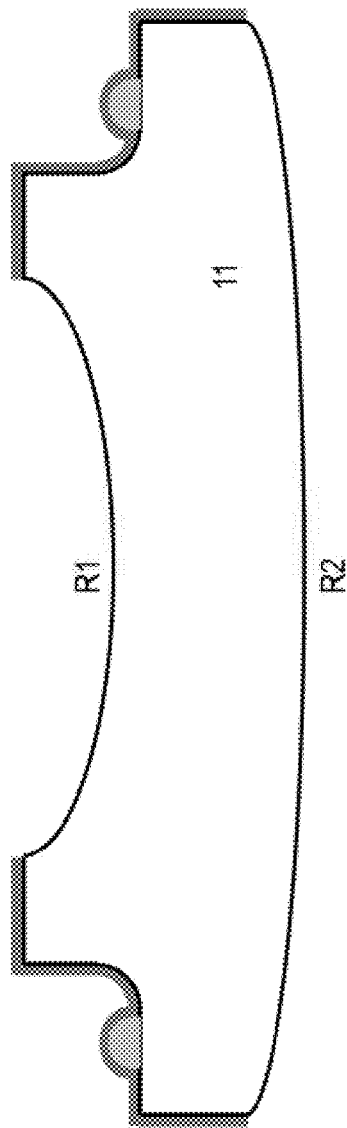

A third method involves applying the light-shielding paint only to a site F to be raised on the optically non-effective surface (edge surface) and thereby forming a raised coating film as shown in FIG. 5A, followed by drying and baking, and then applying the light-shielding paint to the entire area and thereby forming a flat coating film as shown in FIG. 5B, followed by drying and baking.

A fourth method involves applying the light-shielding paint only to a site F to be raised on the optically non-effective surface (edge surface) and thereby forming a raised coating film as shown in FIG. 5A, followed by drying without baking, and then applying the light-shielding paint to the entire area and thereby forming a flat coating film as shown in FIG. 5B, followed by drying and baking.

FIGS. 4A, 4B, 5A and 5B show cases in which a raised area is provided on the edge surface d perpendicular to the optical axis L (i.e., on the more perpendicular edge surface) but the principles are similar when a raised area is provided on the edge surface b parallel to the optical axis L (i.e., on the more parallel edge surface) or when raised areas are provided on both edge surfaces b and d, and the four procedures described above similarly apply to these cases.

EXAMPLES

Concrete examples will be cited as examples (and comparative examples) of the present invention, in which optical elements (lenses) were actually produced by forming light-shielding coating films on substrates (lens substrates) having an edge surface of a stepped shape and evaluations were made as to whether film cracking occurred in the formed light-shielding coating films. However, the present invention is not limited to the following examples and, needless to say, various modifications and changes can be made within the scope of the present invention.

(Lens Substrate)

Figure 6:
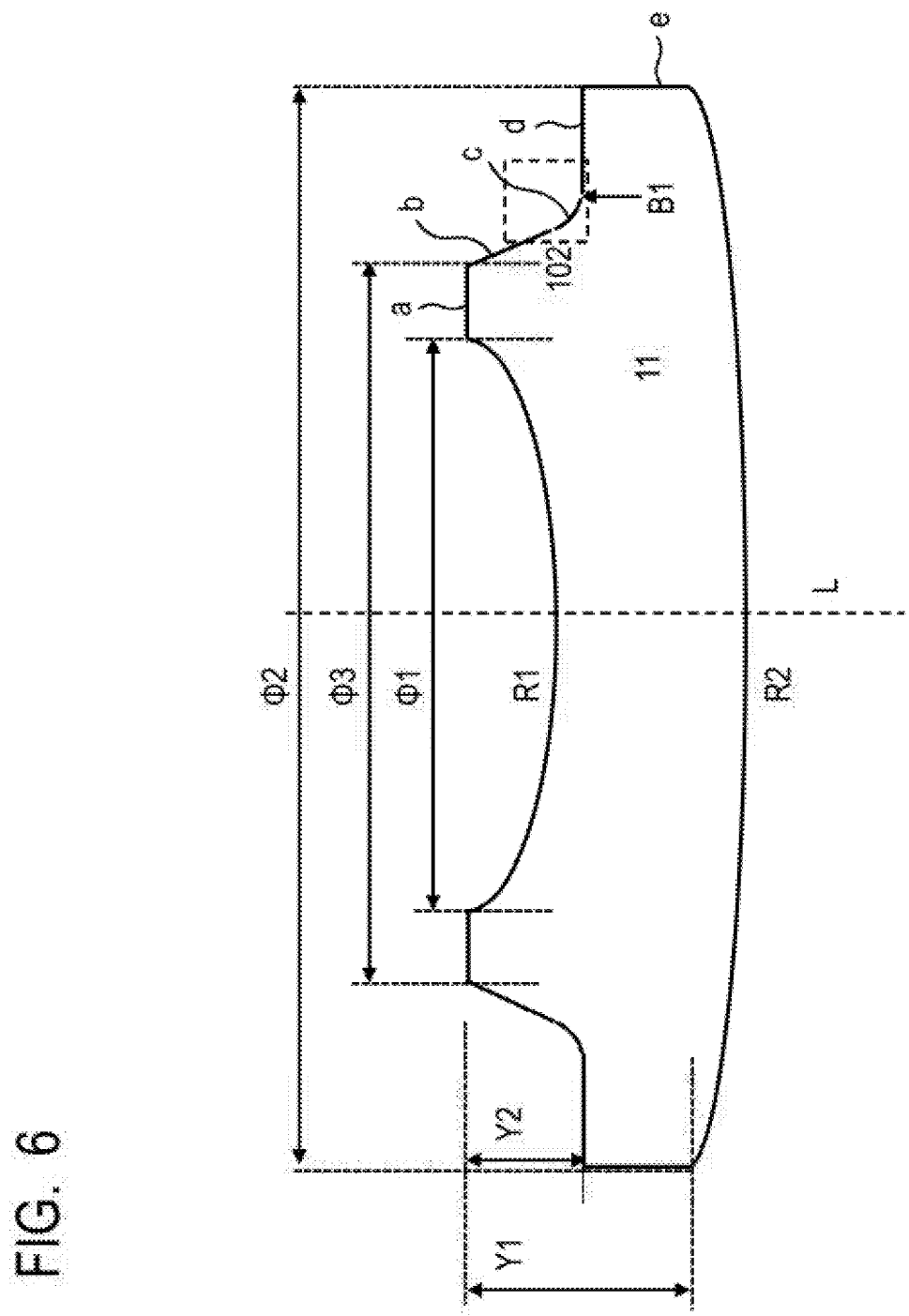
FIG. 6 is a schematic sectional view of lens substrate used in Examples 1 to 10.

The sectional shape of the lens substrate used in the following examples and comparative examples is shown in FIG. 6. The lens substrate 11 shown in FIG. 6 is a concave meniscus lens having an optically effective surface R1, which is a concave surface, and an optically effective surface R2, which is a convex surface. The radius of curvature of the optically effective surface R1 is 45.0 mm, and the radius of curvature of the optically effective surface R2 is 80 mm. The outside diameter φ1 of the optically effective surface R1 is 36.0 mm, the outside diameter φ2 of the optically effective surface R2 is 60 mm, and the outside diameter φ3 of the edge surface a, which is the optically non-effective surface on the outer side of the optically effective surface R1, is 46.0 mm.

The edge surface a and edge surface d are planes perpendicular to the optical axis L, the edge surface b is a cylindrical surface or conical surface (conical surface in FIG. 6) rotationally symmetric with respect to the optical axis L, and the edge surface e is a cylindrical surface rotationally symmetric with respect to the optical axis L and parallel to the optical axis L. The edge surface a and edge surface b form a convex step corner section, the edge surface b and edge surface d form a concave step corner section 102, and the edge surface d and edge surface e form a convex step corner section. The edge surface c, which is a round chamfer of the concave step corner section 102 exists between the edge surface b and edge surface d. The total length (thickness of the outer circumferential part of the lens substrate 11) Y1 of the edge surfaces a to e in the direction parallel to the optical axis L is 10.0 mm and the distance Y2 between the edge surface a and edge surface d, which are surfaces perpendicular to the optical axis L, is 5.0 mm.

Figure 7:
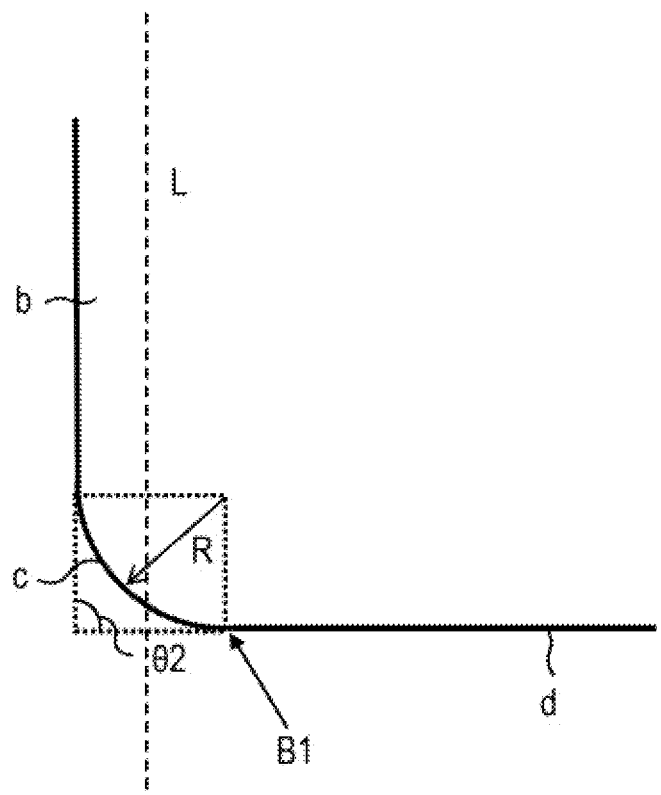
FIG. 7 is an enlarged view showing part of a section of an edge surface of the lens substrate shown in FIG. 6.

FIG. 7 is an enlarged view in the neighborhood of the edge surface c, which is the round chamfer of the concave step corner section 102 on the lens substrate 11 of FIG. 6. An angle (included angle) θ2 formed by the edge surface b and edge surface d is 90 degrees, 110 degrees, or 140 degrees (90 degrees in FIG. 7) and the radius of curvature R of the edge surface c is 0.5 mm or 4 mm.

Note that the lens substrate used in the examples (and comparison examples) were made of glass material containing a large amount of La in addition to $SiO_2$ and having a high index of refraction and were produced by forming the edge surfaces by grinding.

Example 1

The lens substrate 11 used was as follows: the angle (included angle) θ2 formed by the edge surface b and edge surface d was 90 degrees and the radius of curvature R of the edge surface c was 0.5 mm. While the lens substrate 11 was being rotated with the optically effective surface R2 sucked by a sucking and rotating shaft of a coating apparatus, light-shielding paint was applied to the entire edge surfaces by sponge coating method. The light-shielding paint was prepared as follows: using GT-20 (made by Canon Chemicals Inc.) as a light-shielding material, the ingredients were mixed and left to stand for 30 about minutes. When the entire edge surfaces turned dark and the film formed thereon became sufficiently thick, the edge surfaces were allowed to dry under natural conditions for one hour and baked at 80 degrees C. for two hours.

Next, the nozzle center of a dispenser was placed at a position about 400 μm away from the inner end B1 of the edge surface d (see FIG. 7) in a direction perpendicular to the optical axis L, and the light-shielding paint was applied once circumferentially by being discharged continuously at a discharge volume of 10 nl while rotating the lens substrate 11. Then, through drying and baking, the optical element (lens provided with a light-shielding coating film having a raised area) of the present example was formed.

A torn surface of the optical element created using the above procedure was observed under a scanning electron microscope to measure the film thicknesses of the light-shielding coating film 2 in the central part of the edge surface c and at the inner end B1 of the edge surface d, the height T of the raised area 21, and the horizontal distance D (see FIG. 3) from the inner end B1 to the vertex 21A of the raised area.

Also, the created optical element was thermally treated at 160 degrees C. for two hours and then returned to room temperature. Then, after making sure that there was no film cracking,, the optical element was loaded into a high-temperature high-humidity furnace and was taken out after 500 hours. The edge surface c and edge surface d of the optical element taken out was checked from the side of the optically effective surface R2 under an optical microscope. If there was anything that appeared as a white line 50 μm or above in length, it was judged that there was film cracking. Measurement and evaluation results are shown in Table 1.

Example 2

The optical element (lens provided with a light-shielding coating film) of the present example was formed under the same conditions as Example 1 except that the angle (included angle) θ2 formed by the edge surface b and edge surface d on the lens substrate was 110 degrees, and evaluations were made in the same manner as in Example 1. Measurement and evaluation results are shown in Table 1.

Example 3

The optical element (lens provided with a light-shielding coating film) of the present example was formed under the same conditions as Example 1 except that the angle (included angle) θ2 formed by the edge surface b and edge surface d on the lens substrate was 140 degrees, and evaluations were made in the same manner as in Example 1. Measurement and evaluation results are shown in Table 1.

Example 4

The optical element (lens provided with a light-shielding coating film) of the present example was formed under the same conditions as Example 1 except that the radius of curvature R of the edge surface c on the lens substrate was 4.0 mm and that the order was reversed between the formation of the raised area by means of the light-shielding paint and the formation of the light-shielding coating film on the entire edge surfaces, and evaluations were made in the same manner as in Example 1.

Specifically, the procedure for forming the light-shielding coating film 2 was as follows. First, the nozzle center of the dispenser was placed at the position about 400 μm away from the inner end B1 of the edge surface d (see FIG. 7) in the direction perpendicular to the optical axis L, and the light-shielding paint was applied once circumferentially while rotating the lens substrate 11. Then, through drying and baking, the raised area was formed. Next, while the lens substrate 11 with the raised area formed thereon was being rotated with the optically effective surface R2 sucked by the sucking and rotating shaft of the coating apparatus, the light-shielding paint was applied to the entire edge surfaces by sponge coating method. Then, when the entire edge surfaces turned dark and the film formed thereon became sufficiently thick, the edge surfaces were allowed to dry under natural conditions for one hour and baked at 80 degrees C. for two hours, thereby creating the optical element (lens provided with a light-shielding coating film) of the present example. Measurement and evaluation results are shown in Table 1.

Example 5

The optical element (lens provided with a light-shielding coating film) of the present example was formed under the same conditions as Example 4 except that the angle (included angle) θ2 formed by the edge surface b and edge surface d on the lens substrate was 110 degrees, and evaluations were made in the same manner as in Example 1. Measurement and evaluation results are shown in Table 1.

Example 6

The optical element (lens provided with a light-shielding coating film) of the present example was formed under the same conditions as Example 4 except that the angle (included angle) θ2 formed by the edge surface b and edge surface d on the lens substrate was 140 degrees, and evaluations were made in the same manner as in Example 1. Measurement and evaluation results are shown in Table 1.

Comparative Example 1

The optical element (lens provided with a light-shielding coating film) of the present example was formed under the same conditions as Example 1 except that circumferential application of the light-shielding paint from the dispenser was omitted, and evaluations were made in the same manner as in Example 1. Measurement and evaluation results are shown in Table 1.

Comparative Example 2

The optical element (lens provided with a light-shielding coating film) of the present example was formed under the same conditions as Example 3 except that circumferential application of the light-shielding paint from the dispenser was omitted, and evaluations were made in the same manner as in Example 1. Measurement and evaluation results are shown in Table 1.

Comparative Example 3

The optical element (lens provided with a light-shielding coating film) of the present example was formed under the same conditions as Example 4 except that circumferential application of the light-shielding paint from the dispenser was omitted, and evaluations were made in the same manner as in Example 1. Measurement and evaluation results are shown in Table 1.

Comparative Example 4

The optical element (lens provided with a light-shielding coating film) of the present example was formed under the same conditions as Example 6 except that circumferential application of the light-shielding paint from the dispenser was omitted, and evaluations were made in the same manner as in Example 1. Measurement and evaluation results are shown in Table 1.

TABLE 1

| | Included angle θ2 (degrees) | Radius of curvature R (mm) | Maximum film thickness on edge surface c (μm) | Film thickness at inner end B1 of edge surface d (μm) | Height T of raised area 21 (μm) | Distance D from inner end B1 to vertex 21A of raised area (μm) | T/D | Film cracking? |
|---|---|---|---|---|---|---|---|---|
| Comparative example 1 | 90 | 0.5 | 23 | 4 | No raised area on film surface | | | Yes |
| Comparative example 2 | 140 | 0.5 | 19 | 5 | No raised area on film surface | | | Yes |
| Comparative example 3 | 90 | 4 | 22 | 6 | No raised area on film surface | | | Yes |
| Comparative example 4 | 140 | 4 | 20 | 4 | No raised area on film surface | | | Yes |
| Example 1 | 90 | 0.5 | 19 | 4 | 12 | 390 | 0.03 | No |
| Example 2 | 110 | 0.5 | 22 | 6 | 13 | 420 | 0.03 | No |
| Example 3 | 140 | 0.5 | 21 | 6 | 14 | 450 | 0.03 | No |
| Example 4 | 90 | 4 | 21 | 5 | 14 | 440 | 0.03 | No |
| Example 5 | 110 | 4 | 23 | 4 | 12 | 420 | 0.03 | No |
| Example 6 | 140 | 4 | 20 | 6 | 14 | 450 | 0.03 | No |

Example 7

The optical element (lens provided with a light-shielding coating film) of the present example was formed under the same conditions as Example 1 except that the two hours of baking at 80 degrees C. was omitted in the step of forming the light-shielding coating film on the entire edge surfaces, and evaluations were made in the same manner as in Example 1. Measurement and evaluation results are shown in Table 2.

Example 8

The optical element (lens provided with a light-shielding coating film) of the present example was formed using the same lens substrate as Example 1 under the same conditions as Example 1 except that after the ingredients were mixed, the light-shielding paint was left to stand for about four hours before use in circumferential application of the light-shielding paint from the dispenser, and evaluations were made in the same manner as in Example 1. Measurement and evaluation results are shown in Table 2.

Comparative Example 5

The optical element (lens provided with a light-shielding coating film) of the present example was formed under the same conditions as Example 1 except that drying was carried out for only about 10 minutes instead of the one hour of drying under natural conditions and two hours of baking at 80 degrees C. in the step of forming the light-shielding coating film on the entire edge surfaces, and evaluations were made in the same manner as in Example 1. Measurement and evaluation results are shown in Table 2.

Comparative Example 6

The optical element (lens provided with a light-shielding coating film) of the present example was formed using the same lens substrate as Example 1 under the same conditions as Example 1 except that after the ingredients were mixed, the light-shielding paint was left to stand for about six hours before use in circumferential application of the light-shielding paint from the dispenser, and evaluations were made in the same manner as in Example 1. Measurement and evaluation results are shown in Table 2.

being discharged continuously at a discharge volume of 10 nl while rotating the lens substrate 11. The light-shielding paint was prepared as follows: using GT-20 (made by Canon Chemicals Inc.) as a light-shielding material, the ingredients were mixed and left to stand for about four hours. Subsequently, by using the light-shielding paint left to stand for about 30 minutes after the ingredients were mixed, by discharging the light-shielding paint from the dispenser at a discharge volume of 10 nl while rotating the lens substrate 11, and by shifting the dispenser every round, the entire edge surfaces were coated. When the entire edge surfaces turned dark and the film formed thereon became sufficiently thick, the edge surfaces were allowed to dry under natural conditions for one hour and baked at 80 degrees C. for two hours. Measurement and evaluation results are shown in Table 3.

Example 10

The optical element (lens provided with a light-shielding coating film) of the present example was formed under the same conditions as Example 9 except that in forming the raised area, the nozzle center of the dispenser was placed at the position about 600 µm (rather than about 200 µm) away from the inner end B1 of the edge surface d (see FIG. 7) in the direction perpendicular to the optical axis L, that the light-shielding paint was applied twice (rather than once) circumferentially by being discharged continuously at a discharge volume of 10 nl while rotating the lens substrate 11, and that in forming the light-shielding coating film on the entire edge surfaces, the light-shielding paint was applied by

TABLE 2

| | Included angle θ2 (degrees) | Radius of curvature R (mm) | Maximum film thickness on edge surface c (µm) | Film thickness at inner end B1 of edge surface d (µm) | Height T of raised area 21 (µm) | Distance D from inner end B1 to vertex 21A of raised area (µm) | T/D | Film cracking? |
|---|---|---|---|---|---|---|---|---|
| Comparative example 5 | 90 | 0.5 | 32 | 3 | 2 | 410 | 0.01 | Yes |
| Comparative example 6 | 90 | 0.5 | 23 | 6 | 54 | 400 | 0.14 | Yes |
| Example 7 | 90 | 0.5 | 33 | 4 | 8 | 440 | 0.02 | No |
| Example 8 | 90 | 0.5 | 22 | 5 | 39 | 390 | 0.1 | No |

Example 9

The optical element (lens provided with a light-shielding coating film) of the present example was formed under the same conditions as Example 1 except that the order was reversed between the formation of the raised area by means of the light-shielding paint and the formation of the light-shielding coating film on the entire edge surfaces, that in forming the raised area, changes were made in the position of the nozzle center of the dispenser and in the elapsed time after the preparation of the light-shielding paint, and that the dispenser was used rather than the sponge coating method in forming the light-shielding coating film on the entire edge surfaces, and evaluations were made in the same manner as in Example 1.

Specifically, the procedure for forming the light-shielding coating film was as follows. First, the nozzle center of the dispenser was placed at the position about 200 µm away from the inner end B1 of the edge surface d (see FIG. 7) in the direction perpendicular to the optical axis L, and the light-shielding paint was applied once circumferentially by sponge coating method (rather than using the dispenser), and evaluations were made in the same manner as in Example 1. Measurement and evaluation results are shown in Table 3.

Comparative Example 7

The optical element (lens provided with a light-shielding coating film) of the present example was formed under the same conditions as Example 9 except that in forming the raised area using the light-shielding paint, the light-shielding paint was left to stand for about two hours (rather than about four hours) after the ingredients were mixed and that the nozzle center of the dispenser was placed at the position about 100 µm away from the inner end B1 of the edge surface d (see FIG. 7) in the direction perpendicular to the optical axis L, and evaluations were made in the same manner as in Example 1. Measurement and evaluation results are shown in Table 3.

Comparative Example 8

The optical element (lens provided with a light-shielding coating film) of the present example was formed under the same conditions as Example 10 except that in forming the raised area using the light-shielding paint, the light-shielding paint was left to stand for about six hours (rather than about four hours) after the ingredients were mixed, that the nozzle center of the dispenser was placed at the position about 800 µm away from the inner end B1 of the edge surface d (see FIG. 7) in the direction perpendicular to the optical axis L, and that the light-shielding paint was applied three times (rather than twice) circumferentially by being discharged continuously at a discharge volume of 10 nl while rotating the lens substrate 11, and evaluations were made in the same manner as in Example 1. Measurement and evaluation results are shown in Table 3.

TABLE 3

|  | Included angle θ2 (degrees) | Radius of curvature R (mm) | Maximum film thickness on edge surface c (µm) | Film thickness at inner end B1 of edge surface d (µm) | Height T of raised area 21 (µm) | Distance D from inner end B1 to vertex 21A of raised area (µm) | T/D | Film cracking? |
|---|---|---|---|---|---|---|---|---|
| Comparative example 7 | 90 | 0.5 | 32 | 4 | 6 | 80 | 0.8 | Yes |
| Comparative example 8 | 90 | 0.5 | 26 | 6 | 49 | 860 | 0.06 | Yes |
| Example 9 | 90 | 0.5 | 29 | 5 | 12 | 190 | 0.06 | No |
| Example 10 | 90 | 0.5 | 23 | 4 | 32 | 610 | 0.05 | No |

(Evaluations of Examples and Comparative Examples)

It can be seen from Table 1 that when the included angle θ2 between the edge surface b and edge surface d is from 90 to 140 degrees (both inclusive) and the radius of curvature R of the edge surface c is from 0.5 mm to 4 mm (both inclusive), the light-shielding coating film provided on the concave step corner section 102 has the raised area 21 in the neighborhood of the inner end of the edge surface d, allowing film cracking of the light-shielding coating film to be inhibited.

Also, it can be seen from Tables 1 to 3 that desirably the ratio T/D of the height T of the raised area to the horizontal distance D from the inner end B1 to the vertex 21A of the raised area is in the range of 0.02 to 0.10.

Furthermore, it can be seen from Table 3 that it is undesirable that the horizontal distance D from the inner end B1 to the vertex 21A of the raised area falls outside the range of 100 µm to 800 µm and is desirable that the horizontal distance D falls generally within the range of 200 µm to 600 µm.

Note that a maximum film thickness on the edge surface c (film thickness of the light-shielding coating film in the central part of the edge surface c) and the film thickness (of the light-shielding coating film) at the inner end B1 of the edge surface d vary in the range of 19 to 33 µm and in the range of 3 to 6 µm, respectively. This is shown for reference purposes to indicate that the film thicknesses vary considerably even if coatings are applied in the same way. It can be seen from this that whether or not cracking occurs depends on the ratio T/D of the height T of the raised area to the horizontal distance D from the inner end to the vertex of the raised area rather than on the film thicknesses themselves.

While the present invention has been described with reference to an exemplary embodiment, it is to be understood that the present invention is not limited to the disclosed exemplary embodiment and that various modifications and changes can be made within the scope of the invention. For example, the optical element according to the present invention is not limited to a lens and may be a prism, mirror, wave plate, or beam splitter.

The optical element of the present invention can be used for various optical devices such as cameras, microscopes, and projectors.

While the present invention has been described with reference to exemplary embodiments, it is to be understood that the invention is not limited in the disclosed exemplary embodiments. The scope of the following claims is to be accorded the broadest interpretation so as to encompass all such modifications and equivalent structures and functions.

This application claims the benefit of Japanese Patent Application No. 2017-103740, filed May 25, 2017, which is hereby incorporated by reference herein in its entirety.

What is claimed is:

1. An optical element comprising an optically effective surface and an optically non-effective surface, a light-shielding coating film being formed on the optically non-effective surface, wherein:
    the optically non-effective surface includes a concave step corner section; in a section obtained when the optical element is cut along a plane crossing the concave step corner section and perpendicular to a ridge line of the concave step corner section, a line corresponding to a surface of the concave step corner section has a shape in which two line segments are smoothly connected to each other via an arc-shaped curve; and when that end of each of the two line segments which borders on the curve is designated as an inner end of the line segment while an opposite end is designated as an outer end of the line segment, the light-shielding coating film is formed on a surface of the concave step corner section of the optically non-effective surface so as to have a raised area that increases in film thickness continuously or stepwise from the inner end to the outer end and then decreases continuously or stepwise on at least one of the two line segments in the section.

2. The optical element according to claim 1, wherein the two line segments form an angle of 90 to 140 degrees both inclusive and the arc-shaped curve has a radius of curvature of 0.5 mm to 4 mm both inclusive.

3. The optical element according to claim 1, wherein if a difference between a film thickness of the light-shielding coating film at a vertex of the raised area and a film thickness of the light-shielding coating film at the inner end is T and a horizontal distance from the inner end to the vertex is D, T/D is in a range of 0.02 to 0.10.

4. The optical element according to claim 3, wherein the distance D is in a range of 100 µm to 800 µm.

5. The optical element according to claim 4, wherein the distance D is in a range of 200 μm to 600 μm.

6. The optical element according to claim 1, wherein: the optical element is a lens; and the raised area is formed on a surface of the concave step corner section, the surface corresponding to that one of the two line segments which is more perpendicular to an optical axis.

7. An optical device comprising the optical element according to claim 1.

8. A method for producing an optical element by preparing a transparent substrate that includes an optically effective surface and an optically non-effective surface and by forming a light-shielding coating film on the optically non-effective surface of the transparent substrate, wherein
the forming the light-shielding coating film includes: a first step of applying light-shielding paint to a desired region including a concave step corner section of the optically non-effective surface, drying the light-shielding paint, and thereby forming a flat coating film, and a second step of partially applying the light-shielding paint to part of the desired region with the flat coating film formed thereon, drying the light-shielding paint, thereby forming a raised coating film, subsequently baking the entire coating film, and thereby forming the light-shielding coating film having the raised area; or
a first step of partially applying the light-shielding paint to part of a desired region including the concave step corner section of the optically non-effective surface, drying the light-shielding paint, and thereby forming a raised coating film, and a second step of applying the light-shielding paint to the entire desired region including an area with the raised coating film formed thereon, drying the light-shielding paint, thereby forming a flat coating film, subsequently baking the entire coating film, and thereby forming the light-shielding coating film having the raised area.

9. The method for producing an optical element according to claim 8, wherein the optically non-effective surface includes a concave step corner section; and in a section obtained when the optical element is cut along a plane crossing the concave step corner section and perpendicular to a ridge line of the concave step corner section, a line corresponding to a surface of the concave step corner section has a shape in which two line segments are smoothly connected to each other via an arc-shaped curve.

10. The method for producing an optical element according to claim 9, wherein the raised area formed on a surface of the concave step corner section of the optically non-effective surface.

11. The method for producing an optical element according to claim 10, wherein when that end of each of the two line segments which borders on the curve is designated as an inner end of the line segment while an opposite end is designated as an outer end of the line segment, if a difference between a film thickness of the light-shielding coating film at a vertex of the raised area and a film thickness of the light-shielding coating film at the inner end is T and a horizontal distance from the inner end to the vertex is D, T/D is in a range of 0.02 to 0.10.

12. The method for producing an optical element according to claim 8, wherein the first step includes applying and drying the light-shielding paint and then baking a dried coating film.

* * * * *